United States Patent
Doumet

[19]

[11] Patent Number: 6,142,771
[45] Date of Patent: Nov. 7, 2000

[54] CONTROL OF CEMENT CLINKER PRODUCTION USING HIGH SULFUR FUEL IN A LELEP-LEPOL TRAVELLING GRATE ROTARY KILN BY ANALYSIS OF SULFUR IN THE END PRODUCT

[75] Inventor: Joseph Doumet, Ideideh El-Mein, Lebanon

[73] Assignee: Cement Petcoptimizer Company, Virgin Islands (Br.)

[21] Appl. No.: 09/395,224

[22] Filed: Sep. 14, 1999

Related U.S. Application Data

[63] Continuation of application No. 09/268,676, Mar. 16, 1999, which is a continuation of application No. 08/982,367, Dec. 2, 1997, Pat. No. 5,882,190.

[51] Int. Cl.[7] ................................. C04B 2/10
[52] U.S. Cl. .................... 432/14; 432/37; 432/58; 106/758
[58] Field of Search .................. 432/14, 17, 37, 432/58, 113; 106/745, 757, 758; 110/246, 346, 347

[56] References Cited

U.S. PATENT DOCUMENTS

| | | |
|---|---|---|
| 4,022,629 | 5/1977 | Garrett et al. . |
| 4,080,218 | 3/1978 | Mori et al. . |
| 4,102,700 | 7/1978 | Kwech et al. ........................ 106/675 |
| 4,110,121 | 8/1978 | Rechmeier et al. . |
| 4,329,180 | 5/1982 | Herchenbach et al. . |
| 4,372,784 | 2/1983 | Hess . |
| 4,504,319 | 3/1985 | Wolter et al. . |
| 4,508,573 | 4/1985 | Harris . |
| 4,600,438 | 7/1986 | Harris . |
| 4,678,514 | 7/1987 | Deyhle et al. . |
| 4,715,811 | 12/1987 | Lawall . |
| 4,774,064 | 9/1988 | Arnold et al. . |
| 4,913,742 | 4/1990 | Kwech ................................... 106/100 |
| 4,952,147 | 8/1990 | Boyden, II et al. .................. 432/103 |
| 4,993,942 | 2/1991 | Boyden, II et al. .................... 432/14 |
| 5,066,474 | 11/1991 | Laird . |
| 5,098,285 | 3/1992 | Bauer . |
| 5,122,189 | 6/1992 | Garrett et al. ......................... 106/758 |
| 5,156,676 | 10/1992 | Garrett et al. . |
| 5,377,603 | 1/1995 | Reese et al. . |
| 5,556,459 | 9/1996 | Cohen et al. . |
| 5,572,938 | 11/1996 | Leger . |
| 5,626,667 | 5/1997 | Böhle . |
| 5,632,616 | 5/1997 | Tutt et al. . |
| 5,766,339 | 6/1998 | Babu et al. . |
| 5,769,940 | 6/1998 | College . |
| 5,820,814 | 10/1998 | Doumet . |
| 5,833,453 | 11/1998 | Doumet . |
| 5,842,853 | 12/1998 | B hle . |
| 5,882,190 | 3/1999 | Doumet . |
| 5,954,499 | 9/1999 | Jessen . |
| 5,971,302 | 10/1999 | Doumet . |
| 5,972,104 | 10/1999 | Doumet . |
| 5,975,891 | 11/1999 | Hundebøl . |
| 6,012,918 | 1/2000 | Doumet . |

*Primary Examiner*—Denise L. Ferensic
*Assistant Examiner*—Gregory A. Wilson
*Attorney, Agent, or Firm*—Fish & Richardson P.C.

[57] ABSTRACT

A method of producing cement clinker using a high sulfur fuel includes introducing raw material into a Lelep-Lepol travelling grate; drying and heating the raw material in the Lelep-Lepol travelling grate while passing the raw material through the Lelep-Lepol travelling grate; transferring the heated and dried raw material from the Lelep-Lepol travelling grate to a rotary kiln; combusting a high sulfur fuel in the rotary kiln; passing the raw material through the rotary kiln in the presence of the combusting fuel so as to sinter the raw material to form a sintered material; measuring a sulfur content of the sintered material; and controlling an excess concentration of oxygen in the rotary kiln based on the measured sulfur content of the clinker end product.

39 Claims, 4 Drawing Sheets

CONTROL OF CEMENT CLINKER PRODUCTION USING HIGH SULFUR FUEL IN A LELEP-LEPOL TRAVELLING GRATE ROTARY KILN BY ANALYSIS OF SULFUR IN THE END PRODUCT

CROSS REFERENCE TO RELATED APPLICATIONS

This application claims priority from U.S. application Ser. No. 09/268,676, titled "CONTROL OF CEMENT CLINKER PRODUCTION BY ANALYSIS OF SULFUR IN THE END PRODUCT," filed Mar. 16, 1999, which is a continuation of U.S. application Ser. No. 08/982,367 titled, "CONTROL OF CEMENT CLINKER PRODUCTION BY ANALYSIS OF SULFUR IN THE END PRODUCT," filed Dec. 2, 1997 and issued as U.S. Pat. No. 5,882,190 on Mar. 16, 1999, which is incorporated herein by reference.

TECHNICAL FIELD OF THE INVENTION

The invention relates to producing cement clinker using high sulfur fuel in a Lelep-Lepol traveling grate rotary kiln.

BACKGROUND

Cement clinker is produced by sintering a raw material, such as limestone mixed with silica, alumina and iron oxide, in a rotary kiln. The production may take place using a dry, semi-wet, or wet process, or in a rotary kiln that receives heated and dried raw material from a Lelep-Lepol travelling grate.

In the dry process, the raw material passes through a series of cyclones and preheaters that heat the raw material, and through a precalciner that further preheats and precalcines the raw material. The heated and precalcined raw material then enters a rotary kiln in which it is sintered in a sinterization or klinkerization reaction to form cement clinker. The cement clinker is then cooled in a grate cooler and discharged.

In the wet process, the raw material is mixed with water at a grinding step to form a slurry having a water content of approximately 35–40%. The slurry then is passed through a long rotary kiln having a series of zones, which function as chambers, to form cement clinker.

A typical wet process kiln has a fuel consumption per kilogram of clinker produced of between 1,300 and 1,500 kilocalories, depending on the water content of the slurry fed to the kiln. The fuel consumption is approximately 175% of the consumption of a dry process rotary kiln that is equipped with a preheater and precalciner. A kiln having a capacity to produce 1,500 tons of clinker per day typically has a diameter of between four and five meters and a length of between 135 and 150 meters.

The semi-wet process of producing cement clinker involves using a slurry of raw material and water in which the water content is in the range of approximately 15% to 20%. The kiln is equipped with filters that remove a portion of the water from the slurry before it is fed into the kiln.

In a process using a rotary kiln and a Lelep-Lepol travelling grate, the raw material is fed onto the grate in granulated (i.e., nodulized) form and hot gases from the kiln are pulled through the grate to heat and dry the nodules of raw material. The raw material, still in the form of nodules, is then fed into the rotary kiln where the raw material is decarbonated, heated, sintered, and fed into a clinker grate cooler.

SUMMARY

In one general aspect, a method of producing cement clinker using a high sulfur fuel includes introducing raw material into a Lelep-Lepol travelling grate; drying and heating the raw material in the Lelep-Lepol travelling grate while passing the raw material through the Lelep-Lepol travelling grate; transferring the heated and dried raw material from the Lelep-Lepol travelling grate to a rotary kiln; combusting a high sulfur fuel in the rotary kiln; passing the raw material through the rotary kiln in the presence of the combusting fuel so as to sinter the raw material to form a sintered material; measuring a sulfur content of the sintered material; and controlling an excess concentration of oxygen in the rotary kiln based on the measured sulfur content.

Embodiments may include one or more of the following features. For example, the excess concentration of oxygen controlled may be in a sintering zone of the rotary kiln. The first high sulfur fuel may contain more than approximately 5% sulfur, and, in some cases, may contain less than 9% sulfur. The method may include adding a second high sulfur fuel to the raw material before the raw material is fed into the rotary kiln. The second high sulfur fuel may contain more than approximately 5% sulfur, and, in some cases, may contain less than 9% sulfur. The second high sulfur fuel may be combusted in the rotary kiln. Combusting the second high sulfur fuel may include using a portion of the excess oxygen provided in the sintering zone of the rotary kiln.

The method may include controlling the rate at which the second high sulfur fuel is added to the raw material. Controlling the rate at which the second high sulfur fuel is added to the raw material may include controlling the speed of a weigh feeder used to add the second high sulfur fuel to a feed pipe, controlling the speed of a cellula feeder used to add the second high sulfur fuel to a weigh feeder, and controlling the rate based on a concentration of carbon monoxide in a stream of gas exiting the Lelep-Lepol travelling grate before the stream of gas enters an electrostatic precipitator. Controlling the rate at which the second high sulfur fuel is added to the raw material may be independent of the control of the excess concentration of oxygen in the rotary kiln.

Controlling the rate at which the second high sulfur fuel is added to the raw material may include controlling the rate based on a concentration of carbon monoxide in a stream of gas exiting the Lelep-Lepol travelling grate, and using an oxygen analyzer for comparison between the percentage of oxygen and carbon monoxide contained in the gas leaving the process.

Providing excess oxygen may include creating a slightly oxidizing atmosphere in a decarbonation zone of the rotary kiln to reduce NOx emissions. Controlling an excess concentration of oxygen in the sintering zone of the rotary kiln may include providing sufficient excess oxygen to the rotary kiln to maintain a decomposition temperature of $CaSO_4$ of up to approximately 1500° Celsius whereby the decomposition of $CaSO_4$ is practically stopped. The $CaSO_4$ may become a part of the cement clinker in percentages of up to approximately 3% as $SO_3$. The cement clinker may contain sufficient $CaSO_4$ such that $CaSO_4$ does not need to be added to the cement clinker to produce cement. This $CaSO_4$ corresponds to the sulfur entering the process by the fuels and raw material.

The method may further include maintaining a circulation of $SO_2$ in the rotary kiln system at less than 80 kilograms per hour to reduce calcium sulfate and calcium sulfite deposits in the Lelep-Lepol travelling grate, in the rotary kiln, and between the grate and kiln.

In another general aspect, an apparatus for producing cement clinker using a high sulfur fuel includes a Lelep-Lepol travelling grate, a rotary kiln, a feed pipe, and a controller. The Lelep-Lepol travelling grate includes a first end and a second end. The rotary kiln includes a first end and a second end. The first end of the rotary kiln is connected to the second end of the Lelep-Lepol travelling grate and a burner configured to burn a first high sulfur fuel is positioned at the second end of the kiln. The feed pipe has an opening approximately at a connection between the rotary kiln and Lelep-Lepol travelling grate. A second high sulfur fuel is added through the feed pipe. The controller is configured to control a concentration of oxygen in the rotary kiln based on a measured sulfur content of a cement clinker end product.

The method and apparatus of producing cement clinker using high sulfur fuel in a Lelep-Lepol travelling grate rotary kiln system provides considerable advantages. Initially, because $CaSO_4$ does not decompose in the sintering zone of the kiln, or its decomposition is significantly reduced, it remains a component of the cement clinker product and reduces or eliminates the need to add gypsum to the final product. Also, because $SO_2$, a decomposition product, does not recombine with the lime of the raw material, it does not increase the $SO_2$ circulation in the process to a point that sulfite, in the form of $CaSO_3$, and sulfate, in the form of $CaSO_4$, cause coatings in the travelling grate and rings in the rotary kiln, which can stop the process. In addition, because the excess of oxygen at the sintering zone is used at the decarbonation zone of the kiln by the combustion of the solid fuel added between the Lelep-Lepol grate and the rotary kiln, the concentration of NOx in the exhaust gases vented by the exhauster is at a minimum.

Another advantage results because the sulfur contained in the fuel becomes a component of the cement clinker, which means that the burner in the kiln can be operated using fuels with sulfur contents as high as approximately 7–9% before there is too much sulfur in the clinker end product to comply with international standards and specifications. In addition, the fuel added between the Lelep-Lepol travelling grate and the kiln creates the lowest possible oxidizing atmosphere, depending on the amount of carbon monoxide in the main exhauster entry. This oxidizing atmosphere causes decomposition of NOx to nitrogen, thereby reducing emission of NOx pollutants. Because the sulfur in the fuel becomes a part of the cement clinker, the $SO_2$ emissions are reduced. Finally, burning the high sulfur fuel in the decarbonation zone accelerates the rate of decarbonation, which shortens the length of that zone and/or improves the efficiency of the kiln.

Other features and advantages will be apparent from the following description, including the drawings, and from the claims.

DESCRIPTION

Figure 1:
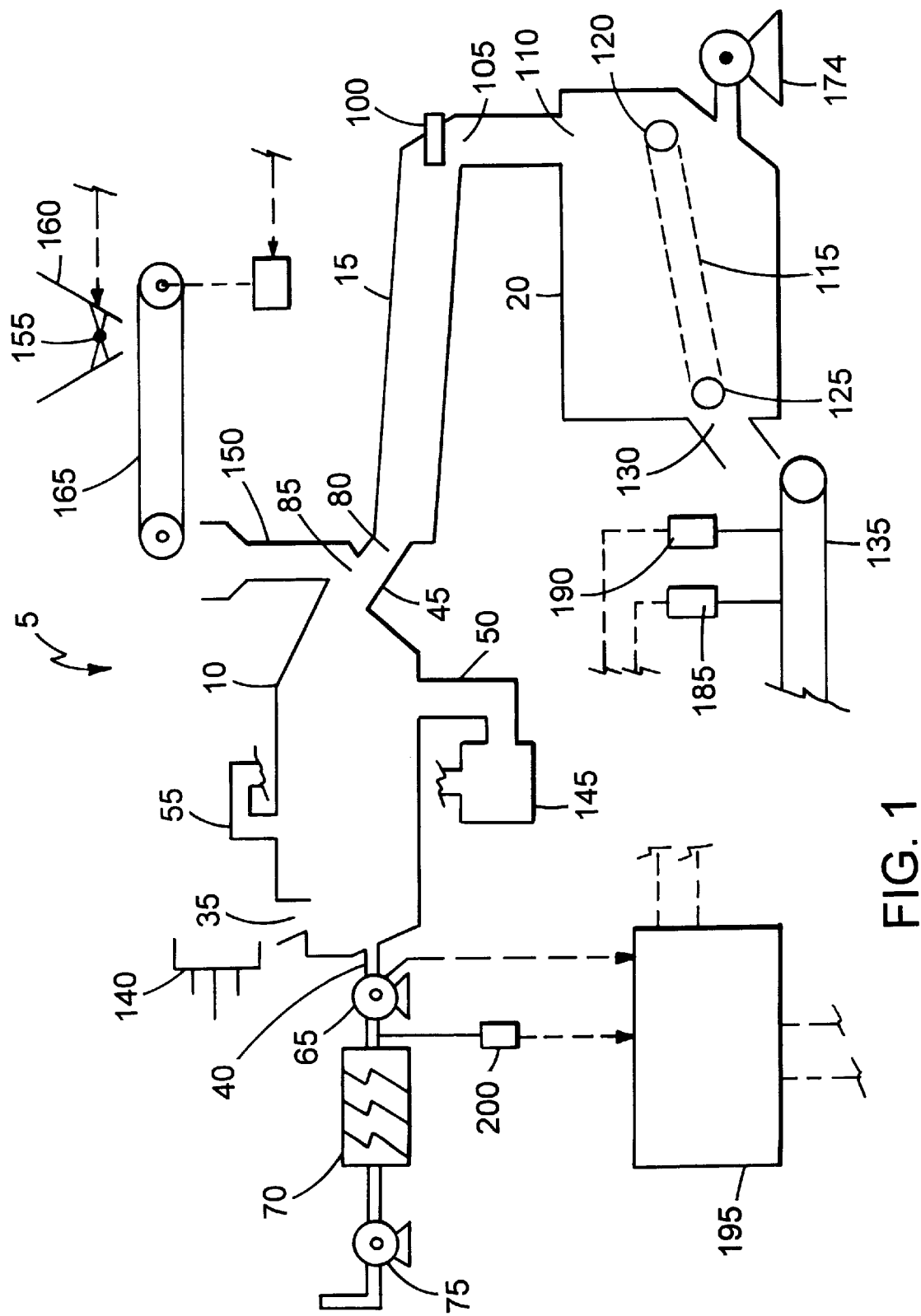
FIG. 1 is a schematic view of a Lelep-Lepol travelling grate rotary kiln system.
Figure 2:
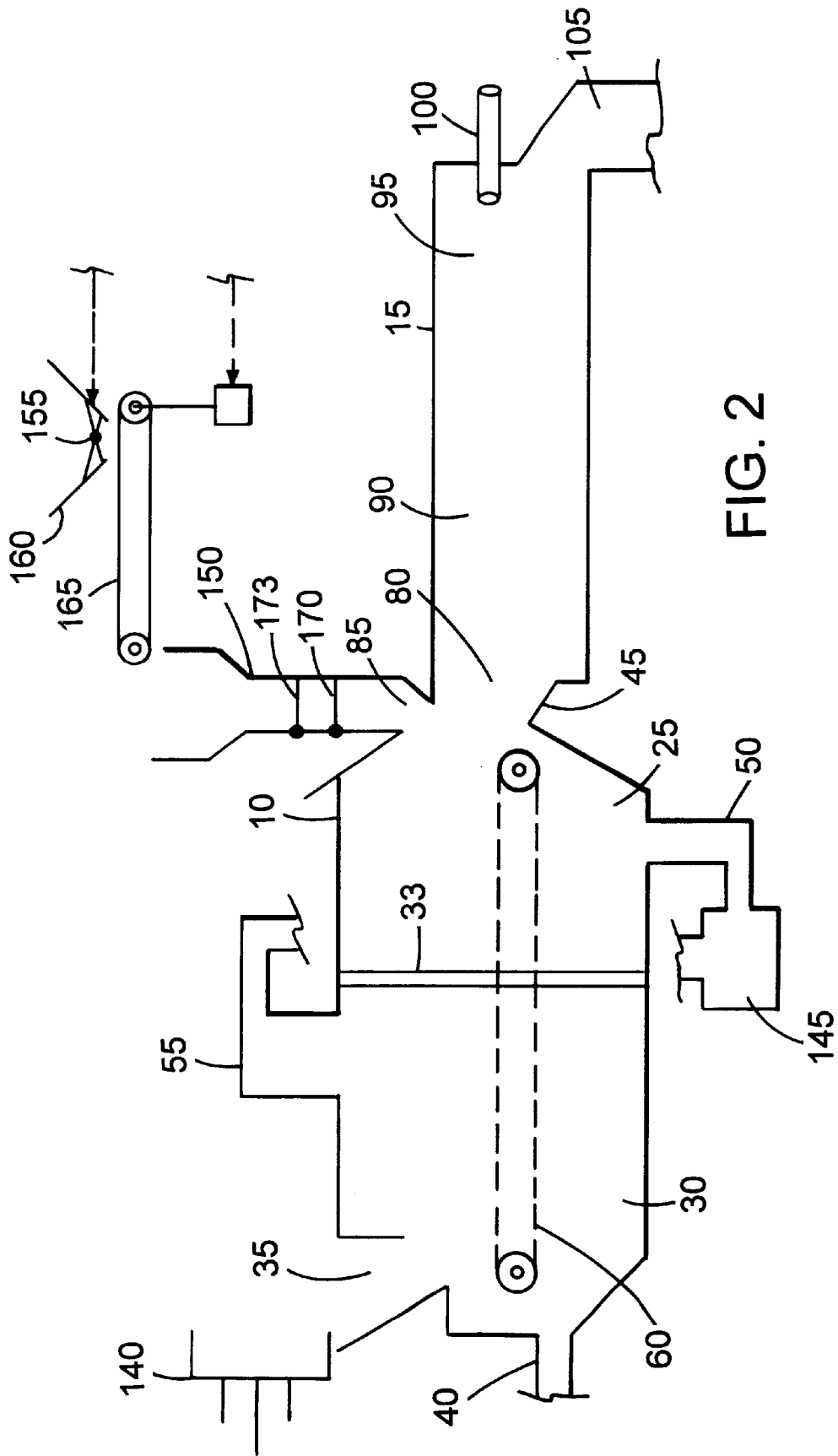
FIG. 2 is a schematic view of the Lelep-Lepol travelling grate, rotary kiln, weigh feeder and cellula feeder of FIG. 1.

Referring to FIG. 1, a Lelep-Lepol travelling grate rotary kiln system 5 for producing cement clinker includes a Lelep-Lepol grate 10, a rotary kiln 15, and a clinker cooler 20. Referring also to FIG. 2, the Lelep-Lepol travelling grate 10 is divided into a first compartment 25 and a second compartment 30 by a wall 33. The Lelep-Lepol travelling grate 10 has a raw material feed inlet 35, a main air exhaust outlet 40, a raw material outlet 45, a gas passage outlet 50, and a gas passage inlet 55. A conveyor grate 60 passes through the compartments 25 and 30.

An inlet of a main exhauster 65 is connected to the main air exhaust outlet 40 of the grate 10. An outlet of the main exhauster 65 is connected to an inlet of an electrostatic precipitator 70. An outlet of the electrostatic precipitator 70 is connected to a secondary exhauster 75, which exhausts into the atmosphere.

The raw material outlet 45 is connected to the rotary kiln 15 at kiln inlet 80. A fuel inlet 85 is adjacent to the nodulized raw material outlet 45. The kiln 15 has a decarbonation zone 90 and a chemical reactions/sintering zone 95. A burner 100 and a kiln outlet 105 are at the end of the kiln 15 opposite the kiln inlet 80. The kiln outlet 105 is connected to an inlet 110 of the clinker cooler 20. A cooler conveyor 115 has a first end 120 adjacent to inlet 110 and a second end 125 adjacent to a clinker cooler outlet 130. A clinker conveyor 135 is located adjacent to cooler outlet 130.

Raw material, such as a homogenized limestone mixture with silica, alumina and iron oxide, is fed onto the conveyor grate 60 of the Lelep-Lepol travelling grate 10 at the raw material inlet feed 35. The raw material comes from a pelletizer or nodulizer 140 that forms the raw materials into granules or nodules and feeds them into the grate 10. The granules have a water content of approximately 11–13% when they are fed into the grate 10.

The conveyor grate 60 moves the granules towards the raw material outlet 45 from the second compartment 30 to the first compartment 25 through the separation wall 33. The granules are dried by a stream of heated gases, still containing some percentage of oxygen, that is pulled through the Lelep-Lepol rotary kiln system 5 by the main exhauster 65. The heat is provided by two sources of combusting fuel: the fuel burned at burner 100 and the burning of a second fuel that is added to the raw material before it enters the kiln 15, for example, at the outlet of the travelling grate. Both fuels may be high sulfur fuels (i.e., fuels that contain over approximately 5% sulfur) that contain up to a maximum of approximately 7–9% sulfur.

The air pulled through the system 5 is pulled by exhauster 65 through the clinker cooler 20, used for combustion in the kiln 15, and the grate 10 into the main exhauster 65. In the clinker cooler 20, the air is heated by the hot cement clinker and the fuel combusts in the air heated by clinker at cooler 20. In the grate 10, these hot gases pass through the raw materials on the conveyor grate 60 in the first compartment 25, into the gas passage outlet 50, and through a series of cyclones 145. The heated air passing through the cyclones 145 contains dust picked up from the raw material through which it has passed. The cyclones separate the dust from the air and direct the dust to the pelletizer 140.

The hot gases exiting the cyclones 145 pass into the gas passage inlet 55, which opens into the second compartment 30. In the second compartment 30, the gas again passes through the nodulized raw material on the conveyor grate 60. The gases then are pulled by the main exhauster from the grate 10 through the main gas exhaust outlet 40. As the air passes through the nodulized raw material in the first and second compartments, it heats and dries the raw material. The nodulized raw material on the conveyor grate 60 is in the form of a layer approximately 150 to 200 mm thick. The separation wall 33 forces the air to pass through the layer of raw material twice, which improves drying efficiency.

After the gas passes through the main air exhaust outlet 40 and the main exhauster 65, it passes through the electrostatic precipitator 70. The dust collected in electrostatic precipitator 70 is directed to pelletizer 140, where it is mixed with the raw material. The gas is pulled from electrostatic precipitator 70 by the secondary exhauster 75, which discharges the gas into the atmosphere.

As the raw material passes through the grate 10 and kiln 15, it is heated up to approximately 1400–1500° C. The raw material is heated to approximately 400° C. in the second compartment 30 and then enters the first compartment 25 where it is heated to approximately 750–800° C. The gases enter the grate 10 from the kiln 15 at approximately 1000° C. and exit the grate at a minimum of 100° C., leaving the raw material heated and dried.

As the raw material passes into the kiln at kiln inlet 80, a coarsely ground fuel, having granules with diameters of 0.5 to 1.0 mm, is added through a feed pipe 150 to form a mixture of raw material and fuel. The fuel is fed into the feed pipe 150 by the combination of a cellula feeder 155 installed in a hopper 160, and a weigh feeder 165. The fuel is placed in the hopper 160, and the cellula feeder 155 is used to regulate the quantity of fuel discharged onto the weigh feeder 165. Flaps 170 and 173 within the feed pipe 150 permit fuel to pass through the pipe into the kiln inlet 80 but prevent the flow of a continuous stream of air through the pipe 150 between the grate 10 and the kiln 15, which would occur if the flaps were not present.

The mixture of raw material and fuel passes into the kiln's decarbonation zone 90 where it is decarbonated (i.e., calcined, the decomposition of $CaCO_3$, calcium carbonate, into CaO and $CO_2$). The fuel component of the mixture combusts in the decarbonation zone 90, which accelerates the decarbonation by raising the temperature in that zone. Because the combustion accelerates the decarbonation, the decarbonation zone 90 may be shorter than in conventional kilns and/or the efficiency of the kiln may be improved.

The kiln 15 is inclined such that the kiln inlet 80 is higher than the kiln outlet 105 so that the mixture flows from the decarbonation zone 90 into the chemical reactions/sintering zone 95 as a result of gravity. In the chemical reactions/sintering zone 95, the raw material undergoes chemical reactions and is sintered into cement clinker. The sintered raw material is heated in the kiln 15 to approximately 1400–1500° C. before it passes through kiln outlet 105 and enters the inlet 110 of clinker cooler 20.

In clinker cooler 20, a cooling fans system 174 cools the cement clinker by blowing cooling air through it, which heats the air to approximately 800–850° C. This heated air is pulled into the kiln 15 through kiln inlet 80 by main exhauster 65. The cooled cement clinker is conveyed on conveyor 120 through clinker cooler outlet 130 onto a conveyor 135, which conveys it away from the clinker cooler 20.

As noted above, fuel for combusting is provided in the Lelep-Lepol rotary kiln system 5 at two locations: burner 100 and feed pipe 150. Although high sulfur fuel may be used at both of these locations, high levels of some sulfur compounds circulating in the kiln 15 may cause blockages in the kiln. As described below, control of the oxygen level in the chemical reactions/sintering zone 95 of the kiln 15 is a key to using high sulfur fuels and preventing blockages. Using high sulfur fuels increases the concentration of sulfur in the gases in the kiln 15 in the form of sulfur dioxide ($SO_2$). The increased sulfur dioxide affects the stability of the raw material, which contains up to approximately 65% CaO, because the CaO combines with the $SO_2$ to form calcium sulfite ($CaSO_3$) and calcium sulfate ($CaSO_4$). Calcium sulfite decomposes at approximately 1000° C. in the reaction $CaSO_3 \rightarrow CaO + SO_2$. Calcium sulfate decomposes at approximately 1200° C. in the reaction $CaSO_4 \rightarrow CaO + SO_2 + \frac{1}{2}O_2$.

The increase in sulfur present in the kiln creates a tendency for the calcium sulfite and calcium sulfate to decompose and the $SO_2$ to react with the CaO in the raw material. These reactions cause rings of calcium sulfite and calcium sulfate to form on the interior of the kiln, which eventually build up and block the production in the kiln 15.

The extent of decomposition of calcium sulfite and calcium sulfate can be reduced significantly by varying the speed of the main exhauster 65 to increase the amount of oxygen present in the circulating gases flowing through the kiln 15 and, in particular, in the chemical reactions/sintering zone 95. Excess oxygen prevents the decomposition by increasing the temperature at which calcium sulfate decomposes to approximately 1500° C., which is slightly greater than the sintering temperature in the chemical reactions/sintering zone 95. Preventing the calcium sulfate from decomposing ensures that it stays in the raw material during klinkerization and passes through the kiln and becomes a component of the cement clinker end product.

Figure 3:
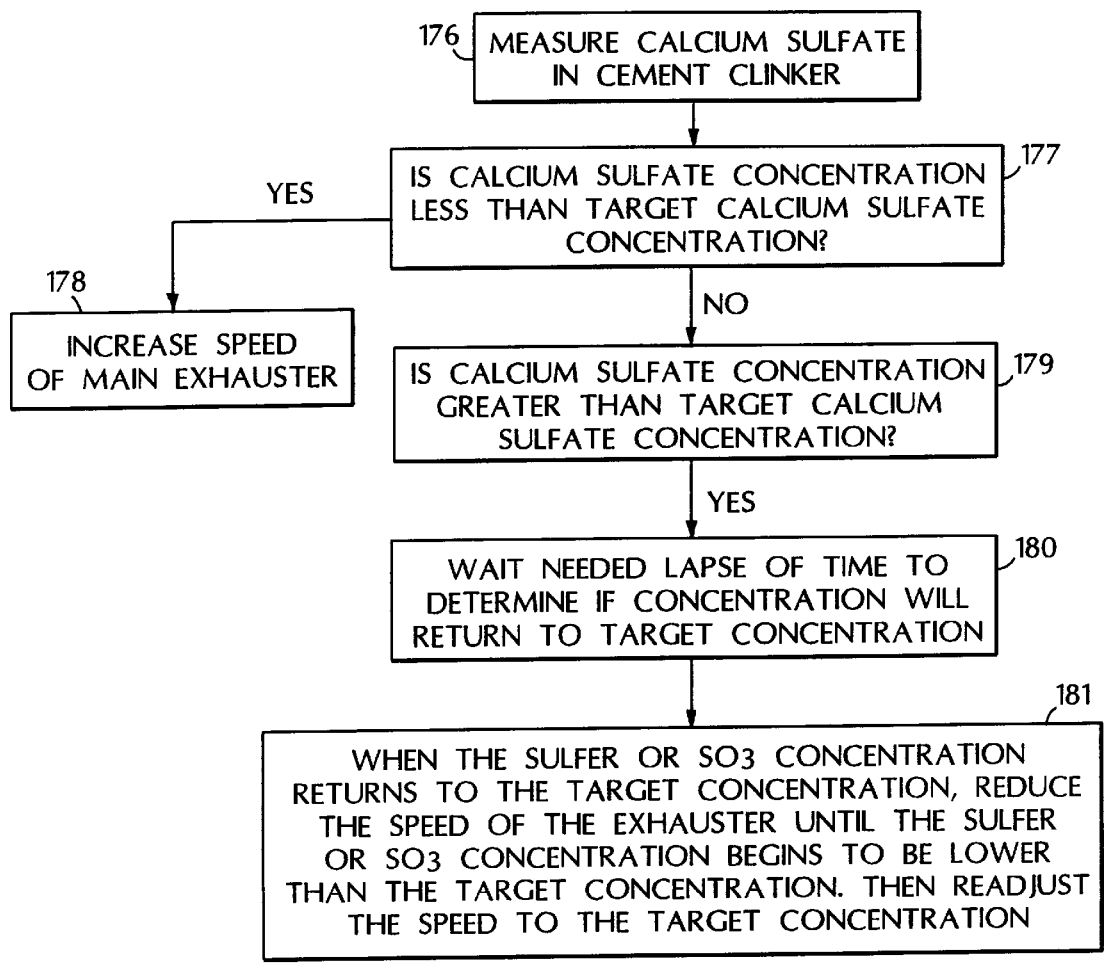
FIG. 3 is a flow chart of a decision making process for the control of excess oxygen.

The amount of excess oxygen necessary to significantly stop calcium sulfate decomposition is in the range of approximately 4.5% to 5.5%. The excess oxygen is provided by forcing more air through the chemical reactions/sintering zone 95 by increasing the speed of the main exhauster 65. Because there is a relationship between the amount of excess oxygen and the extent of decomposition of calcium sulfate, the quantity of sulfur, in the form of calcium sulfate, present in the cement clinker produced correlates well with the amount of excess oxygen provided in the sintering zone 165. For example, referring also to FIG. 3, if there is little calcium sulfate measured (step 176) in the cement clinker produced, such that the measured level is less than a target level (step 177), the kiln's operator knows that there is not enough oxygen being provided in the kiln to prevent decomposition, and that calcium sulfate and calcium sulfite deposits are likely to be forming in the kiln. To reduce the decomposition, the operator increases the excess oxygen in the kiln 15 by increasing the speed of the main exhauster 65 (step 178). As discussed below with respect to FIG. 4, control of the excess oxygen level may be implemented as an automatic process.

If the quantity of calcium sulfate in the cement clinker is greater than the calculated quantity of $SO_3$ that should be discharged in the clinker end product (step 179), the operator waits for a necessary lapse of time. Because the decomposition and discharge of the calcium sulfate making up the coatings or rings in the kiln can temporarily increase the content of $SO_3$ discharged in the clinker, the operator waits for the calculated amount of $SO_3$ to be discharged in the clinker end product (step 180). This then lets the discharged level of $SO_3$ in the clinker return to the expected value.

After waiting, the quantity of $SO_3$ in the product should return to the target level. The operator then gradually reduces the speed of the main exhauster 65 in small increments until the quantity of $SO_3$ in the end product begins to be lower than the target level. At this point, the operator increases the speed of the main exhauster 65 to provide the level of excess oxygen necessary to attain the target percentage of $SO_3$ in the end product. The operator thus continuously varies the speed of the exhauster 65 in a narrowing range to keep the percent of $SO_3$ in the end product near the target level (step 181). This continuous regulation of the excess oxygen level in the sintering zone can be executed, for example, every two or three hours to prevent providing too much excess oxygen, which would otherwise reduce the efficiency of the system by increasing the power consumption.

The excess of oxygen in the chemical reactions/sintering zone 95 of the kiln creates a highly oxidizing atmosphere that stops the decomposition of $CaSO_4$. Much of the excess oxygen is used in the decarbonation zone 90 to combust the coarse ground fuel that is added between the Lelep-Lepol travelling grate and the rotary kiln 15 in the decarbonation zone 90. The operator or automatic controller regulates the quantity of fuel entering the kiln 15 at kiln inlet 80 through feed pipe 150 to control the quantity of carbon monoxide at the main exhauster inlet 65 by using at the same time the percentage of oxygen measured at the main exhauster inlet 65 for comparison.

Although the excess of oxygen in the chemical reactions/sintering zone 95 is mostly used in the decarbonation zone 90 to burn the fuel added through feed pipe 150, the atmosphere feeding into the main exhauster 65 will continue to be slightly oxidizing at the decarbonation zone outlet. Because the atmosphere at decarbonation zone 90 is only slightly oxidizing, which partially reduces the NOx to oxygen and nitrogen, and because the gases fed into the exhauster 65 also are slightly oxidizing, a level of approximately 200 mg of NOx per normal cubic meter of gas will be present in the gas passing through the exhauster 65 and into and through the electrostatic precipitator 70.

The speed of the main exhauster 65 is controlled to produce a concentration of oxygen in the chemical reactions/sintering zone 95 that causes the cement clinker produced to have a calcium sulfate concentration that correlates closely with the amount of sulfur necessary to indicate that the sulfur entering the system through the fuel and raw material is purged from the process.

Figure 4:
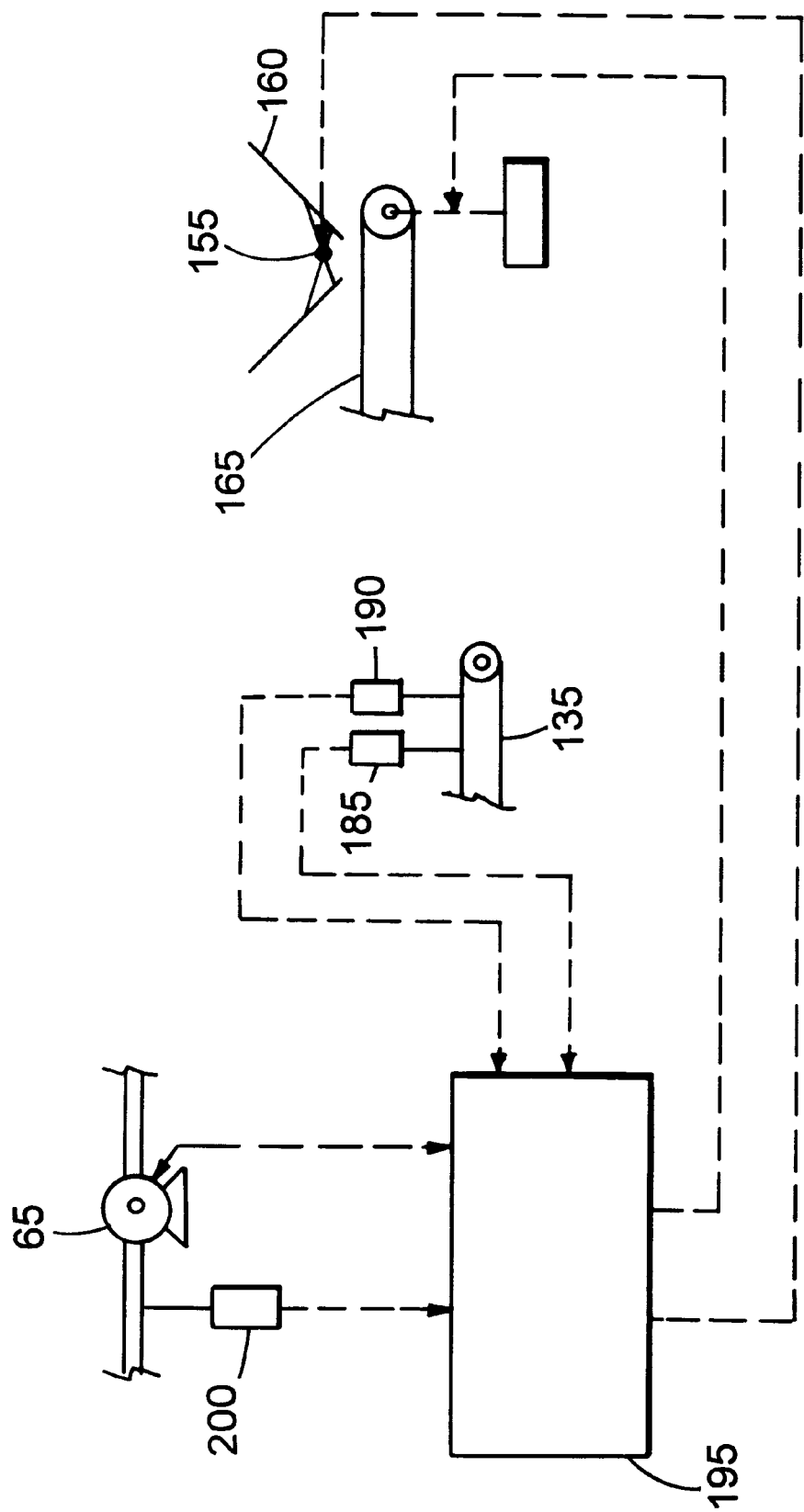
FIG. 4 is a schematic view of the controller of FIG. 1 and the components of the rotary kiln system to which it is connected.

Referring also to FIG. 4, a pair of sulfur analyzers 185 and 190 measure the calcium sulfate concentration in the cement clinker end product leaving the clinker cooler 20. The resulting measurements are transmitted to a controller 195, which uses the measurements to vary the speed of the main exhauster 65 on the basis of a $SO_3$ target value. The $SO_3$ target value concentration is set in the controller after calculating the $SO_3$ percentage that must be purged based on the sulfur in the fuel consumed and in the raw material.

The controller 195 increases the speed of the exhauster 65 to provide enough excess oxygen in the chemical reaction/sintering zone 95 to prevent decomposition of calcium sulfate. The controller 195 simultaneously controls the quantity of $SO_3$ in the end product by purging sulfur from the system 5 and adjusts the speed at the exhauster 65 using a control program in the controller 195. The controller, on a semi-continuous basis, lowers and raises the speed to maintain the $SO_3$ percentage in the clinker end product while maintaining the lowest excess of oxygen possible in the chemical reactions/sintering zone 95.

The controller gradually reduces the speed of the main exhauster 65 in small increments until the quantity of $SO_3$ in the end product begins to be lower than the target level. At this point, the controller adjusts the speed of the main exhauster 65 upward to provide that level of excess of oxygen necessary to attain the target percentage of $SO_3$ in the end product. The controller 195 thus continuously varies up and down the speed of the exhauster 65 in a narrowing range to keep the percent of $SO_3$ in the end product near the target level. This controls the excess oxygen level to prevent too much excess oxygen, which would otherwise reduce the efficiency of the system by increasing the power consumption.

Although an excess oxygen concentration of approximately 4.5 to 5.5% is provided in the chemical reactions/sintering zone 95, the burning of the fuel added at feed pipe 150 consumes the largest portion of that excess oxygen in the decarbonation zone 90. The burning fuel reduces the excess oxygen concentration to approximately 1 to 1.5% by the time the gas is in the grate 10. Thus, the gas pulled into the electrostatic precipitator 70 will have percentage of carbon monoxide from 0,6–0,8% and an excess oxygen concentration of approximately 1 to 2%, which reduces the risk of an explosion at the electrostatic precipitator 70. The maximum amount of carbon monoxide in the gases fed to the electrostatic precipitator is controlled by controlling the amount of coarse ground fuel added at feed pipe 150.

An analyzer/probe 200 measures carbon monoxide and oxygen concentrations at the inlet to electrostatic precipitator 70. The oxygen concentration is recorded and the carbon monoxide concentration is used by the controller 195 to control the speed of the cellula feeder 155 or the speed of the weigh feeder 165. The feeders 155 and 165 are controlled to maintain a carbon monoxide concentration entering the electrostatic precipitator 70 at a preset maximum of approximately 0.6 to 0.8%.

If the concentration of carbon monoxide exceeds the preset maximum concentration, the cellula feeder 155 will reduce the rate at which fuel is fed to the weigh feeder 165. The weigh feeder 165 also may be slowed to reduce the rate at which fuel is fed into the feed pipe 150.

The amount of excess oxygen necessary to shift the reaction to $CaSO_4$ is controlled based on the amount of sulfur entering the system in the fuel and raw material and the amount of $CaSO_4$ that can be a component of the finished product. Using the kiln's known rate of fuel consumption per ton of cement clinker produced and the concentration of sulfur in the fuel, the quantity of sulfur that can be converted into $CaSO_4$ can be calculated by the control box. If there also is sulfur in the raw material, that percentage must be added to the amount of sulfur that can be converted into $CaSO_4$.

Using 3% as the maximum amount of $SO_3$ that is acceptable in one ton of cement clinker end product, the controller 195 uses the measured amount of sulfur in the cement clinker, in the form of $CaSO_4$, to determine the extent to which the $CaSO_4$ is decomposing and the $SO_2$ is passing through the system. If the $CaSO_4$ is decomposing in the system, as indicated by a cement clinker sulfur content less than the needed quantity to purge the system of sulfur, the controller 195 increases the exhauster's 65 speed to increase the amount of oxygen in the chemical reactions/sintering zone 95 of the kiln.

The amount of sulfur in the cement clinker end product is measured by separate sulfur analyzers 185 and 190. As a backup, the oxygen and carbon monoxide concentration at the entrance to the electrostatic precipitator 70 is measured by the analyzer/probe 200 and transmitted to controller 195. The controller 195 records the fluctuations in oxygen and carbon monoxide concentration of gas from the main air exhaust outlet 40 and uses the carbon monoxide result to control the weigh feeder 165 and the cellula feeder 155 to regulate the quantity of solid fuel added at feed pipe 150.

As an example of the operation of the Lelep-Lepol travelling grate rotary kiln system 5, if the fuel used in the burners is petroleum coke containing 7–9% sulfur with a calorific value of 8,000 kilocalories per kilogram, the consumption of fuel would be approximately 137.5 kg of petroleum coke per metric ton of clinker produced. Because 137.5 kilograms of 8% sulfur petroleum coke contains 11 kilograms of sulfur, and the ratio by weight of sulfur to sulfur trioxide ($SO_3$) is 32 to 80, 11 kilograms of sulfur can react to form 27.5 kilograms of sulfur trioxide.

If the entire 27.5 kilograms of sulfur trioxide is contained in one metric ton of cement clinker, the clinker contains 2.75% sulfur trioxide—a concentration compatible with international norms. If the raw material contains sulfur, the fuel must contain proportionally less sulfur to prevent the concentration of sulfur trioxide in the cement clinker from exceeding 2.5–3%, assuming that 2.5–3% is the maximum acceptable percentage of sulfur trioxide.

A drop in the concentration of sulfur trioxide in the cement clinker measured at the clinker conveyor 135 indicates that there is insufficient oxygen in the chemical reactions/sintering zone 95 of the kiln and that calcium sulfate is decomposing. To correct this, the controller 195 uses the value of the concentration of sulfur in the cement clinker produced to increase the speed of the exhauster 65. The oxygen in the additional air increases the decomposition temperature of the calcium sulfate, thereby reducing the decomposition of calcium sulfate in the kiln 15 and causing that calcium sulfate to become part of the cement clinker. The end result is an increase in sulfur trioxide in the cement clinker to approximately 2.75%.

The two controls, the speed of exhauster 65 and the rate of flow of fuel to feed pipe 150, permit controlling the quantity of excess oxygen in the chemical reactions/sintering zone 95, which has the highest temperature in the rotary kiln 15. By providing an excess of oxygen (4.5 to 5.5%), the decomposition of calcium sulfate is reduced, thereby permitting this calcium sulfate to exit from the kiln 15 into the clinker cooler 20 as a component of the sintered clinker.

The second of these controls also permits the shortening of the decarbonation zone 90, or an increase in production of the kiln (i.e., an increase in the kiln efficiency). By adding coarsely ground fuel at the kiln inlet 80 through feed pipe 150, the fuel combusts in the kiln, which accelerates the decarbonation rate by raising the temperature in that zone. The amount of fuel added may have an upper limit that is related to the highest permissible percentage of carbon monoxide (0.6–0.8%) that may be exhausted into the electrostatic precipitator 70, a value which is preset in the controller 195.

If carbon monoxide and oxygen percentages measured at the inlet to the electrostatic precipitator 70 drop, such as could occur if the probe/analyzer 200 is clogged off, the controller 195 starts an alarm that indicates that the analyzer/probe must be checked. After a set lapse of time, the controller 195 stops the cellula feeder 155 and the weigh feeder 165 until the probe/analyzer 200 has been checked. The cellula feeder 155 and weigh feeder 165 must then be manually restarted from the controller 195, which then again controls the speed of the cellula feeder 155 and the weigh feeder 165 to ensure that the carbon monoxide concentration at the electrostatic precipitator 70 is at the preset percentage of approximately 0.6–0.8%.

Other embodiments are within the scope of the following claims.

What is claimed is:

1. A method of producing cement clinker, comprising:
   introducing raw material into a Lelep-Lepol travelling grate;
   drying and heating the raw material in the Lelep-Lepol travelling grate while passing the raw material through the Lelep-Lepol travelling grate; transferring the heated and dried raw material from the Lelep-Lepol travelling grate to a rotary kiln; combusting a high sulfur fuel in the rotary kiln; passing the raw material through the rotary kiln in the presence of the combusting fuel so as to sinter the raw material to form a sintered material;
   measuring a sulfur content of the sintered material; and
   controlling an excess concentration of oxygen in the rotary kiln based on the measured sulfur content.

2. The method of claim 1, wherein controlling an excess concentration of oxygen comprises controlling an excess of oxygen in a sintering zone of the rotary kiln.

3. The method of claim 1, wherein the high sulfur fuel contains more than approximately 5% sulfur.

4. The method of claim 1, wherein the high sulfur fuel contains approximately 5–9% sulfur.

5. The method of claim 1, further comprising adding a second high sulfur fuel to the raw material while the raw material is fed into the rotary kiln.

6. The method of claim 5, wherein the second high sulfur fuel contains more than approximately 5% sulfur.

7. The method of claim 5, wherein the second high sulfur fuel contains approximately 5–9% sulfur.

8. The method of claim 5, further comprising combusting the second high sulfur fuel in the rotary kiln.

9. The method of claim 8, wherein combusting the second high sulfur fuel uses at least a portion of the excess oxygen provided in the rotary kiln.

10. The method of claim 9, wherein combusting the second high sulfur fuel uses at least a portion of the excess oxygen provided in a sintering zone of the rotary kiln.

11. The method of claim 9, wherein controlling the rate at which the second high sulfur fuel is added to the raw material comprises controlling the rate based on a concentration of carbon monoxide in a stream of gas exiting the Lelep-Lepol travelling grate before the stream of gas enters an electrostatic precipitator.

12. The method of claim 5, further comprising controlling the rate at which the second high sulfur fuel is added to the raw material.

13. The method of claim 12, wherein controlling the rate at which the second high sulfur fuel is added to the raw material comprises controlling the speed of a weigh feeder used to add the second high sulfur fuel to a feed pipe.

14. The method of claim 12, wherein controlling the rate at which the second high sulfur fuel is added to the raw material comprises controlling the speed of a cellula feeder used to add the second high sulfur fuel to a weigh feeder.

15. The method of claim 12, wherein controlling the rate at which the second high sulfur fuel is added to the raw material further comprises controlling the rate based on a concentration of carbon monoxide in a stream of gas exiting the Lelep-Lepol travelling grate.

16. The method of claim 12, wherein controlling the rate at which the second high sulfur fuel is added to the raw material is independent of the control of the excess concentration of oxygen in the rotary kiln.

17. The method of claim 16, wherein controlling the rate at which the second high sulfur fuel is added to the raw material is independent of a control of an excess concentration of oxygen in a sintering zone of the rotary kiln.

18. The method of claim 5, wherein adding a second high sulfur fuel creates an oxidizing atmosphere in a decarbonation zone of the rotary kiln whereby NOx emissions are reduced and carbon monoxide levels are maintained at or below a target carbon monoxide concentration.

19. The method of claim 1, further comprising measuring the concentration of oxygen in a stream of gas existing the Lelep-Lepol grate before the stream of gas enters an electrostatic precipitator, and using the oxygen concentration in controlling the percentage of carbon monoxide entering the electrostatic precipitator.

20. The method of claim 1, wherein controlling an excess concentration of oxygen in a sintering zone of the rotary kiln comprises providing sufficient excess oxygen to the sintering zone of the rotary kiln to maintain a decomposition temperature of $CaSO_4$ of up to approximately 1500° Celsius whereby the decomposition of $CaSO_4$ is reduced.

21. The method of claim 20, wherein controlling an excess concentration of oxygen in the sintering zone stops the decomposition of $CaSO_4$.

22. The method of claim 20, wherein the $CaSO_4$ becomes part of the cement clinker in percentages of up to approximately 3%.

23. The method of claim 22, wherein the cement clinker contains sufficient $CaSO_4$ such that $CaSO_4$ does not need to be added to the cement clinker to control the setting time of produced cement.

24. The method of claim 1, further comprising maintaining a circulation of $SO_2$ in the rotary kiln system at less than 80 kilograms per hour to reduce calcium sulfate and calcium sulfite deposits in the Lelep-Lepol travelling grate, in the rotary kiln, and between the grate and kiln.

25. The method of claim 1, wherein the raw material is in a granulated form.

26. An apparatus for producing cement clinker using high sulfur fuels, comprising:
   a Lelep-Lepol travelling grate having a first end and a second end;
   a rotary kiln having a first end and a second end, wherein the first end of the rotary kiln is connected to the second end of the Lelep-Lepol travelling grate and a burner configured to burn a first high sulfur fuel is positioned at the second end of the kiln;
   a feed pipe having an opening approximately at a connection between the rotary kiln and Lelep-Lepol travelling grate, and through which a second high sulfur fuel is added; and
   a controller configured to control a concentration of oxygen in the rotary kiln based on a measured sulfur content of a cement clinker end product.

27. The apparatus of claim 26, further comprising an exhauster, wherein the controller is configured to control the concentration of oxygen in the kiln by controlling the speed of the exhauster.

28. The apparatus of claim 27, further comprising at least one sulfur analyzer for measuring a sulfur concentration in the cement clinker end product, wherein the speed of the exhauster is controlled by the controller in response to a concentration of sulfur measured in the cement clinker end product.

29. The apparatus of claim 27, wherein the controller is further configured to control the speed of the exhauster based on a concentration of oxygen in a sintering zone of the kiln.

30. The apparatus of claim 26, further comprising a weigh feeder configured to feed the second high sulfur fuel into the feed pipe, wherein the speed of the weigh feeder is controlled by the controller.

31. The apparatus of claim 30, further comprising at least one carbon monoxide analyzer for measuring carbon monoxide in a stream of gas exiting the first end of the travelling grate, wherein the speed of the weigh feeder is controlled in response to the concentration of carbon monoxide measured in the stream of gas exiting the first end of the travelling grate.

32. The apparatus of claim 26, further comprising at least one sulfur analyzer to measure a sulfur concentration in the cement clinker end product.

33. The apparatus of claim 26, further comprising a cellula feeder configured to feed the second high sulfur fuel onto a weigh feeder, wherein the weigh feeder is configured to feed the high sulfur fuel into the feed pipe and the speed of the cellula feeder is controlled by the controller.

34. The apparatus of claim 33, further comprising at least one carbon monoxide analyzer for measuring carbon monoxide in a stream of gas exiting the first end of the travelling grate, wherein the speed of the cellula feeder is controlled in response to the concentration of carbon monoxide measured in the stream of gas exiting the first end of the travelling grate.

35. The apparatus of claim 26, wherein the first high sulfur fuel contains more than approximately 5% sulfur.

36. The apparatus of claim 26, wherein the first high sulfur fuel contains approximately 5–9% sulfur.

37. The apparatus of claim 26, wherein the second high sulfur fuel contains more than approximately 5% sulfur.

38. The apparatus of claim 26, wherein the second high sulfur fuel contains approximately 5–9% sulfur.

39. The apparatus of claim 26, wherein the controller is further configured to control a concentration of oxygen in a sintering zone of the rotary kiln based on a measured sulfur content of a cement clinker end product.

* * * * *